United States Patent
Darcy et al.

(10) Patent No.: US 11,512,218 B2
(45) Date of Patent: Nov. 29, 2022

(54) COATING COMPOSITION AND USE THEREOF

(71) Applicant: PPG Europe B.V., Amsterdam (NL)

(72) Inventors: Stephane Darcy, Valdoie (FR); Anne Fabre, Echenans sous Mont Vaudois (FR)

(73) Assignee: PPG Europe B.V., Amsterdam (NL)

( * ) Notice: Subject to any disclaimer, the term of this patent is extended or adjusted under 35 U.S.C. 154(b) by 96 days.

(21) Appl. No.: 16/498,224

(22) PCT Filed: Mar. 30, 2018

(86) PCT No.: PCT/EP2018/058278
§ 371 (c)(1),
(2) Date: Sep. 26, 2019

(87) PCT Pub. No.: WO2018/178329
PCT Pub. Date: Oct. 4, 2018

(65) Prior Publication Data
US 2020/0032097 A1 Jan. 30, 2020

(30) Foreign Application Priority Data

Mar. 31, 2017 (EP) .................... 17164217

(51) Int. Cl.
| | | |
|---|---|---|
| C09D 133/08 | (2006.01) | |
| C09D 7/65 | (2018.01) | |
| C09D 7/61 | (2018.01) | |
| C09D 7/40 | (2018.01) | |
| C08K 7/28 | (2006.01) | |
| C08L 27/08 | (2006.01) | |
| C08L 35/04 | (2006.01) | |

(52) U.S. Cl.
CPC .............. *C09D 133/08* (2013.01); *C08K 7/28* (2013.01); *C09D 7/61* (2018.01); *C09D 7/65* (2018.01); *C09D 7/70* (2018.01); *C08L 27/08* (2013.01); *C08L 35/04* (2013.01); *C08L 2205/18* (2013.01)

(58) Field of Classification Search
CPC ..................................................... C09D 7/70
See application file for complete search history.

(56) References Cited

U.S. PATENT DOCUMENTS

| | | | | |
|---|---|---|---|---|
| 4,228,055 A | * | 10/1980 | Wallace | C09D 157/00 524/377 |
| 2008/0207774 A1 | | 8/2008 | Krishnan | |
| 2008/0233062 A1 | | 9/2008 | Krishnan | |
| 2009/0155472 A1 | * | 6/2009 | Grasse | C09D 133/04 427/385.5 |
| 2011/0184088 A1 | | 7/2011 | Lohmeijer et al. | |
| 2012/0100289 A1 | * | 4/2012 | Egan | E04B 1/7604 427/196 |
| 2012/0121886 A1 | * | 5/2012 | Huang | C09D 7/65 428/313.5 |
| 2013/0105473 A1 | * | 5/2013 | Beaudry | B05D 3/12 220/1.5 |
| 2015/0176267 A1 | * | 6/2015 | Casimiro | C04B 26/04 428/313.5 |
| 2019/0380923 A1 | * | 12/2019 | Valverde | A61K 8/375 |

FOREIGN PATENT DOCUMENTS

| | | |
|---|---|---|
| CN | 104291741 A | 1/2015 |
| EP | 0971007 B1 | 9/2001 |
| EP | 1045014 B1 | 8/2005 |
| EP | 2871169 A1 | 5/2015 |
| WO | 2014003852 A2 | 1/2014 |

OTHER PUBLICATIONS

Machine translation of EP 971007, 2021 (Year: 2021).*
Rhoplex AC 1230M Acrylic Emulsion, https://www.dow.com/en-us/pdp.rhoplex-ac-1230m-acrylic-emulsion.177859z.html, accessed 2021 (Year: 2021).*

* cited by examiner

*Primary Examiner* — Liam J Heincer
(74) *Attorney, Agent, or Firm* — Krisanne Shideler

(57) ABSTRACT

The invention relates to a coating composition comprising:—a polymeric coating binder; wherein the polymeric coating binder has a glass temperature Tg of at least 0° C. and at most 30° C.;—at least one first filler, wherein the first filler comprises expanded polymeric microspheres; and, at least one second filler, wherein the second filler comprises expanded glass particles; wherein said coating composition comprises at least 0.1% by weight and at most 25% by weight of said at least one first filler and at least one second filler combined, based on the total weight of the composition. The invention also relates to the use of such a coating composition as an exterior wall masonry paint. The invention also relates a substrate having applied thereon such a coating composition.

17 Claims, No Drawings

COATING COMPOSITION AND USE THEREOF

FIELD OF THE INVENTION

The invention relates to a coating composition. In particular the present invention relates to a water-based coating composition with a low density. The invention also relates to the use of such a coating composition as an exterior wall masonry paint. The invention also relates a substrate having applied thereon such a coating composition

BACKGROUND OF THE INVENTION

Painters have to handle large buckets of paint in sometimes difficult situations, such as on ladders and on scaffolding. Especially for façade painting, the volume of paint needed can be significant. Hence, also the weight of these buckets is significant, making them heavy to handle, and making the job of being a painter physically demanding. Even during application of the paint to a vertical surface or a ceiling, the painter has to lift a roller loaded with that paint for a prolonged time above shoulder level. For these reasons, there is a need in the art to provide a coating composition that provides better working conditions for painters. Especially for façade paint, it is favourable that the coating composition is elastic and/or that the coating composition is crack bridging.

Volatile organic compounds (VOC) in a coating composition are both harmful for the painter and for the environment. Regulations determine maximum levels of VOC content (expressed in g/l) in coating compositions. However it is still beneficial for the welfare of the painter and for the environments to provide coating compositions with an even lower VOC content.

When formulating a coating composition, it is not always possible to allow controlling the amount of gloss that a coating has upon curing. Especially a matt finish is not always possible to achieve depending on the types and amount of ingredients used in said formulation.

Coating compositions, and especially façade coating compositions, need to be permeable to water and vapour, as this allows water and vapours that are present in the substrate where onto this coating composition is applied to escape the substrate, preventing damp problems and mold growth.

In addition, a coating composition needs to be stable when stored, particularly in terms of density, viscosity, and/or composition, to ensure intrinsic properties will be maintained during its shelf-life which is traditionally from 12 months to 24 months.

It is accordingly one of the objects of the present invention to overcome or ameliorate one or more of the aforementioned disadvantages of the prior art.

SUMMARY OF THE INVENTION

The present inventors have now found that these one or more of these objects can be obtained by altering the coating composition.

The inventors have surprisingly found that a specific combination of two lightweight fillers in a polymeric coating binder allowed achieving a lightweight and stable coating composition. A further aim of the inventors was to formulate a coating composition with a low density, which results in a coating with a matt finish upon curing. A further aim of the inventors was to formulate a coating composition with a low density, which possesses at least the same intrinsic paint performances as other coating compositions. Yet another aim of the inventors was to formulate a coating composition with a low density, which results in a coating with a satin finish upon curing. Yet another aim of the inventors was to formulate a coating composition that is flexible and/or crack bridging. Yet another aim of the inventors was to formulate a coating composition that has good vapour permeability. Still another aim of the inventors was to formulate a coating composition with a low VOC-content, preferably significantly lower than the upper limit given by regulations. The inventors aimed to obtain a coating composition that still maintains overall coating performance, particularly for a wall paint, such as a wall masonry paint, such as an interior wall paint or an exterior wall paint, for example an exterior wall masonry paint.

According to a first aspect, the present invention relates to a coating composition comprising:
  a polymeric coating binder; preferably wherein the polymeric coating binder has a glass temperature Tg of at least 0° C. and at most 30° C., preferably as measured according to ISO 11357-2 (2013);
  at least one first filler, wherein the first filler comprises expanded polymeric microspheres; and
  at least one second filler, wherein the second filler comprises expanded glass particles, preferably expanded silica glass particles;
  wherein said coating composition comprises at least 0.1% by weight and at most 25% by weight of said at least one first filler and at least one second filler combined, based on the total weight of the composition.

In some embodiments, the ratio of the total weight of the first filler to the total weight of the second filler is at least 1:40.0.

In some embodiments, the ratio of the total weight of the first filler to the total weight of the second filler is at most 1:1.0.

In some embodiments, the first filler comprises expanded particles of a copolymer of vinylidene chloride and acrylonitrile.

In some embodiments, the second filler comprises expanded perlite particles.

In some embodiments, the polymeric coating binder is selected from the group comprising: a (meth)acrylic coating binder, a vinylic coating binder, a silicone-based coating binder, a siloxane-based binder, or any mixture thereof.

In some embodiments, the polymeric coating binder has a temperature Tg of at least 7° C. and at most 27° C., for example of at least 10° C. and at most 25° C.

In some embodiments, the ratio of the pigment volume concentration (PVC) over the critical pigment volume concentration (cPVC) is from at least 0.70 to at most 1.30, preferably from at least 0.80 to at most 1.20, more preferably from at least 0.90 to at most 1.10, even more preferably from at least 0.97 to at most 1.01, and most preferably from at least 0.99 to at most 1.00.

In some alternative embodiments, the ratio of the pigment volume concentration (PVC) over the critical pigment volume concentration (cPVC) is from at least 0.70 to at most 1.30, preferably from at least 0.80 to at most 1.27, more preferably from at least 0.90 to at most 1.25, even more preferably from at least 0.95 to at most 1.23, and most preferably from at least 1.05 to at most 1.20.

In some embodiments, the total amount of polymeric coating binder in said coating composition ranges from at least 1 to at most 40% by weight, preferably from at least 2 to at most 30% by weight, more preferably from at least 3 to at most 25% by weight, even more preferably from at least 4 to at most 20% by weight, still even more preferably from at least 5 to at most 15% by weight, and most preferably from at least 5 to at most 14% by weight, compared to the total weight of said coating composition.

In some preferred embodiments, the coating composition comprises at least 0.1% by weight and at most 25.0% by weight of said at least one first filler and at least one second filler combined, based on the total weight of the composition, preferably at least 0.5% by weight and at most 20.0% by weight, preferably at least 1.5% by weight and at most 15% by weight, for example at least 3.0% by weight and at most 10% by weight.

In some embodiments, said at least one first filler and said at least one second filler have a true density of at most 750 kg/m$^3$, preferably of at most 600 kg/m$^3$, more preferably of at most 500 kg/m$^3$, and most preferably of at most 400 kg/m$^3$, as determined by gas displacement pycnometer according to ASTM D2840 (1969).

In some embodiments, said at least one first filler has a true density of at most 100 kg/m$^3$, preferably of at most 75 kg/m$^3$, more preferably of at most 60 kg/m$^3$, even more preferably of at most 50 kg/m$^3$, and most preferably of at most 40 kg/m$^3$, as determined by gas displacement pycnometer according to ASTM D2840 (1969).

In some embodiments, from at least 1 to at most 70% by weight, preferably from at least 5 to at most 50% by weight, more preferably from at least 10 to at most 30% by weight, even more preferably from at least 12 to at most 25% by weight, and most preferably from at least 16 to at most 20% by weight, based on the total weight of fillers, is a lightweight filler, wherein said light weight filler has a true density of at most 500 kg/m$^3$, as determined by gas displacement pycnometer according to ASTM D2840 (1969). In this context, titanium dioxide is seen as a filler, preferably a non-expanded filler. Titanium dioxide is a filler that also functions as a colourant. In the present context, when taking the weight into account, it should be classed as a filler and not as a colourant or additive.

In some embodiments, the coating composition has a relative density from at least 0.80 to at most 1.30, preferably from at least 0.90 to at most 1.20, more preferably from at least 0.95 to at most 1.15, even more preferably from at least 0.97 to at most 1.10, still more preferably from at least 0.98 to at most 1.05, and most preferably from at least 0.99 to 1.03.

According to a second aspect, the present invention relates to use of the coating composition according to the first aspect, or preferred embodiments thereof, as coating, varnish, lacquer, paint, stain, enamel, printing ink or floor covering. (Preferred) embodiments of the first aspect are also (preferred) embodiments of the second aspect, and vice versa.

In a preferred embodiment, the present invention relates to the use of a coating composition according to the first aspect, or preferred embodiments thereof, as an exterior wall masonry paint.

According to a third aspect, the present invention relates to a substrate having applied thereon a coating composition according to the first aspect, or preferred embodiments thereof. (Preferred) embodiments of the first or second aspect are also (preferred) embodiments of the third aspect, and vice versa.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

When describing the compositions of the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As used in the specification and the appended claims, the singular forms "a", "an," and "the" include plural referents unless the context clearly dictates otherwise. By way of example, "a binder" means one binder or more than one binder. As used herein, the term "polymer" comprises homopolymers (e.g., prepared from a single monomer species), copolymers (e.g., prepared from at least two monomer species), and graft polymers.

Unless defined otherwise, all technical and scientific terms used herein have the same meaning as is commonly understood by one of skill in the art. All publications referenced herein are incorporated by reference thereto.

Throughout this application, the term 'about' is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

According to a first aspect, the present invention relates to a coating composition comprising:
  a polymeric coating binder; preferably wherein the polymeric coating binder has a glass temperature Tg of at least 0° C. and at most 30° C., as measured according to ISO 11357-2;
  at least one first filler, wherein the first filler comprises expanded polymeric microspheres; and
  at least one second filler, wherein the second filler comprises expanded glass particles, preferably expanded silica glass particles;
  wherein said coating composition comprises at least 0.1% by weight and at most 25% by weight of said at least one first filler and at least one second filler combined, based on the total weight of the composition. The composition comprises at least 3 separate components: the first filler is different from the second filler, and both are different from the coating binder.

In some embodiments, the coating composition comprises at least 0.5% by weight and at most 20% by weight, more preferably at least 1% by weight and at most 15% by weight, even more preferably from 3% by weight to at most 10% by weight and most preferably from 5% by weight to at most 7% by weight of said at least one first filler and at least one second filler combined, based on the total weight of the composition The coating composition comprises a polymeric coating binder, preferably a non-elastomeric coating binder. The polymeric coating binder preferably has a glass temperature Tg of at least 0° C. and at most 30° C.

As used herein the term "Tg" refers to the glass transition temperature. As used herein, Tg values and ranges recited with regard to the polymeric coating binder of the coating composition are determined with Differential Scanning calorimetry.

The inventors have surprisingly found that the present range facilitates the use of the combination of particles as claimed. This range of Tg, combined with the particular combination of fillers as claimed, allowed to reduce the density, but also to maintain overall paint properties. For a Tg over 30° C., it was found that the formulation was too brittle. Furthermore, it was found that with a Tg over 30° C., the coating had high VOC and it would be difficult to meet VOC requirements, particularly VOC requirements applicable to masonry coatings.

When the Tg was below 0° C., the formulation comprising both fillers was found to be less effective. In addition, it was found that a lower Tg led to higher dirt collection and led to higher dirt pick up, and more frequent renovation cycles were needed.

Preferably the Tg was determined according to NF EN ISO 11357-2 (2014), based on the definitions in NF EN ISO 11357-1 (2009), using Indium as a calibration material using. A TA Instruments: DSC 2920, Modulated DSC was used as equipment, and TA Instruments Universal Analysis 2000, Version 3.9A was used as software. Water and indium were used to calibrate the equipment. Samples were placed in non-hermetically closed aluminium pans equipped with lids. Helium was used to purge the DSC cell. 3 runs were performed, each run started with equilibrating the sample and a isothermal for 5 min at 0° C., followed by heating the sample at a rate of 4° C. to 100° C. No forced or quenched cooling was used between runs.

Samples were prepared in one piece of 5 to 13 mg of dried drawdown. Therefore the coating composition was applied on a PTFE foil and a piece of the appropriate weight is taken for the measurement.

Modulated DSC (MDSC) has been used to discriminate between reversible and non-reversible heat flow to determine the glass transition temperature.

The glass transition temperature (Tg) of all samples was measured in duplicate. The glass transition was characterized with three temperatures: $T_{onset}$, Tg and $T_{endset}$. The width of the transition equals $T_{endset}$ minus $T_{onset}$.

The following instrument setup is used to measure the Tg for each of the three runs:
Equilibrate at −50° C.;
Modulation with an amplitude ±1° C. and an oscillation period of 55 sec;
Isothermal for 5 minutes at 0° C.;
Ramp 4° C./min to 100° C.

For the Tg determination, the "Half-step-height method" is used according to ISO 11357-2 (2013), section 10.1.2.

The polymeric coating binder preferably has a glass temperature Tg of at least 0° C. and at most 30° C. In some embodiments, the polymeric coating binder has a glass temperature Tg of at least 5° C. and at most 29° C., for example of at least 6° C. and at most 28° C., preferably a glass temperature Tg of at least 7° C. and at most 27° C., for example of at least 8° C. and at most 26° C., for example of at least 9° C. and at most 25° C., more preferably a glass temperature Tg of at least 10° C. and at most 25° C., for example a glass temperature Tg of at least 12° C. and at most 24° C., for example a glass temperature Tg of at least 14° C. and at most 23° C., for example a glass temperature Tg of at least 16° C. and at most 22° C., for example a glass temperature Tg of at least 18° C. and at most 21° C., for example a glass temperature Tg of about 20° C. Different combinations of end-points are also preferred embodiments, for example from at least 7° C. and at most 30° C. Preferred ranges show improved viscosity stability. In some embodiments, the coating composition is an exterior paint formula with a Tg in one of the above ranges.

In some embodiments, when multiple binders are present, at least one of these binders has a Tg in the preferred range(s). In some embodiments, when multiple binders are present, the average Tg is in the preferred range(s). In some embodiments, when a binder has multiple glass transition temperatures, at least one of Tg is in the preferred range(s). In some embodiments, when a binder has multiple glass transition temperatures, the average Tg is in the preferred range(s).

The coating binder is a polymeric coating binder. As used herein, the term "polymeric" refers to coating binders based on polymers, as opposed to inorganic coatings that would contain inorganic binders such as silicate potassium or calcium hydroxide with a maximum of 5% by weight of polymeric material, for example plaster.

In some preferred embodiments, the polymeric coating binder is a non-elastomeric coating binder. The terms "elastomeric" and "elastic" are used interchangeably herein, and refer to coating binders with the ability to bridge static/dynamic gaps of the substrate, ranging from 0.1 μm to 2500 μm, preferably 100 μm to 2500 μm. For exterior masonry coatings, "elastomeric" means that the coating falls in the A1 to A5 classification according to EN ISO 1062-7:2004. The terms "non-elastomeric" and "non-elastic" refer to coating binders that are not elastomeric or elastic. For exterior masonry coatings, "non-elastomeric" means that the coating falls in the A0 classification according to EN ISO 1062-7:2004. The non-elastomeric coating binder preferably has a Tg as described herein. In some preferred embodiments, the polymeric coating binder falls in the A0 classification according to EN ISO 1062-7:2004, preferably with a Tg as described herein.

In some embodiments, the polymeric coating binder is selected from the group comprising: a (meth)acrylic coating binder, a vinylic coating binder, a silicone-based coating binder, a siloxane-based binder, or any mixture thereof. Preferably, the polymeric coating binder is vinyl acetate ethylene (VAE) coating binder, a (meth)acrylic coating binder or a mixture thereof, more preferably a (meth)acrylic coating binder.

As used herein, the term "(meth)acrylate" and similar terms, such as "(meth)acrylic acid ester" comprises methacrylates and/or acrylates. As used herein, the term "(meth)acrylic acid" comprises methacrylic acid and/or acrylic acid.

As used herein, the term "(meth)acrylic polymer" means a polymer prepared from one or more (meth)acrylate monomers, optionally (meth)acrylic acid monomers, and optionally one or more other ethylenically unsaturated radically polymerisable monomers, and which correspondingly include residues of one or more (meth)acrylate monomers (or one or more (meth)acrylate monomer units), optionally residues of (meth)acrylic acid monomers (or (meth)acrylic acid monomer units), and optionally residues of one or more other ethylenically unsaturated radically polymerisable monomers. The term "(meth)acrylic coating binder" refers to a coating binder comprising a (meth)acrylic polymer.

Preferred (meth)acrylate monomers include acrylic acid, methacrylic acid and the esters of such acids. Preferred esters include alkyl (meth) acrylates which term refers to the corresponding acrylate or methacrylate ester which are usually formed from the corresponding acrylic or methacrylic acids by reaction with an alkanol. In other words the term "alkyl (meth) acrylate" refers to either an alkyl methacrylate or an alkyl acrylate. Other (meth) acrylate monomers include hydroxyl functional monomers such as hydroxyethyl acrylate, hydroxyethyl methacrylate and hydroxybutyl acrylate and amine functional monomers such as dimethylaminoethyl methacrylate.

Preferably, the alkyl (meth) acrylate is a ($C_1$-$C_{22}$) alkyl (meth) acrylate. Examples of $C_1$-$C_{22}$ alkyl groups of the alkyl (meth) acrylates includes methyl, ethyl, n-propyl, n-butyl, iso-butyl, tert-butyl, iso-propyl, pentyl, hexyl, cyclohexyl, 2-ethyl hexyl, heptyl, octyl, ethylhexyl, nonyl, decyl, isodecyl, undecyl, dodecyl, tridecyl, tetradecyl, pentadecyl, hexadecyl, heptadecyl, octadecyl, nonadecyl, eicosyl, behenyl, and isomers thereof. When there are a sufficient number of carbon atoms, the alkyl group may be straight or branched chain. Preferably, the ($C_1$-$C_{22}$) alkyl (meth) acrylate is a ($C_1$-$C_8$) alkyl methacrylate, in particular methyl methacrylate, ethyl acrylate, butyl acrylate, butyl methacrylate and 2-ethylhexyl acrylate, and isomers thereof.

In some embodiments, the coating binder may be a copolymer, more preferably a styrene (meth) acrylic copolymer, preferably a styrene (meth) acrylic copolymer derivable from a monomer mixture comprising greater than or equal to 30% by weight and less than or equal to 60% by weight of one or more alkyl (meth)acrylate comonomers and greater than or equal to 40% by weight and less than or equal to 70% by weight of one or more optionally substituted styrene comonomers. In a preferred embodiment, the styrene (meth) acrylic copolymer is a copolymer as disclosed in WO 2005/028572, which is incorporated in this document by reference.

The coating binder of the coating composition may be prepared by art-recognized methods, such as, but not limited to, free radical polymerization methods, and living radical polymerization methods, such as atom transfer radical polymerization methods and/or electron transfer radical polymerization methods, preferably by emulsion, suspension or dispersion polymerization, in each case using appropriate initiators, catalysts, and molecular weight control agents, in appropriate amounts, as the case may be.

In some embodiments, the coating binder has a weight average molecular weight (Mw) of at least 5,000 Da, preferably at least 25,000 Da, more preferably at least 50,000 Da, even more preferably at least 100,000 Da, still more preferably at least 200,000 Da and most preferably at least 300,000 Da. In some embodiments, the coating binder has a weight average molecular weight (Mw) of less than or equal to 1,000,000 Da, preferably less than or equal to 750,000 Da, more preferably less than or equal to 600,000 Da and most preferably less than or equal to 500,000 Da. The weight average molecular weight of the coating binder can, in some embodiments, range between any combination of these upper and lower values, inclusive of the recited values, such as from 5,000 to 1,000,000 Da, or from 100,000 to 750,000 Da, or from 300,000 to 500,000 Da. The weight average molecular weight is preferably determined by high pressure liquid chromatography (HPLC) wherein the binder is solubilized in THF and compared to monodispersed standards such as polystyrene or polymethylmethacrylate standards.

In some embodiments, the total amount of polymeric coating binder in the coating composition ranges from at least 1 to at most 40% by weight, preferably from at least 2 to at most 30% by weight, more preferably from at least 3 to at most 25% by weight, even more preferably from at least 4 to at most 20% by weight, still even more preferably from at least 5 to at most 15% by weight, and most preferably from at least 5 to at most 14% by weight, compared to the total weight of said coating composition.

The coating composition comprises at least one first filler and at least one second filler. The first filler is different from the second filler, and different from the coating binder.

In some embodiments, the first filler comprises expanded particles of a polymer selected from the group comprising: a polyurethane, a polystyrene, a polyvinylidene chloride, a poly acrylate, a polymethyl methacrylate, a polyacrylonitrile, or copolymers comprising one or more of the in this list mentioned polymers, preferably the first filler comprises expanded particles of a copolymer of vinylidene chloride and acrylonitrile. Preferably, the first filler comprises pure polymeric particles.

The term "microsphere" refers to particles with an (average, D50) particle size from 0.1 to 500 μm, preferably from 1 to 300 μm, more preferably 10 to 200 μm, even more preferably from 20 to 80 μm and most preferably from 30 to 50 μm. Preferably said microspheres are generally spherical. Said microspheres can be solid, but more preferably said microspheres comprise a cavity. Said cavity can be empty or can comprise a gas or a liquid. Said cavity can be completely closed off for material exchange with the environment or can be open towards the environment.

The measurement of the particle size can be made according to the International Standard ISO 13320:2009 ("Particle size analysis—Laser diffraction methods"). For example, the D50 can be measured by laser diffraction analysis. Malvern Instruments' laser diffraction systems may advantageously be used. Preferably, the particle size is measured by laser diffraction analysis on a Malvern type analyser. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

In some embodiments, the at least one first filler has a true density of at most 100 kg/m$^3$, preferably of at most 75 kg/m$^3$, more preferably of at most 60 kg/m$^3$, even more preferably of at most 50 kg/m$^3$, and most preferably of at most 40 kg/m$^3$, as determined by gas displacement pycnometer according to ASTM D2840 (1969).

The term "true density" refers to the intrinsic density of the material. True density does not consider the voids which surround the particles of fillers.

In some embodiments, the first filler comprises expanded particles with a true density of at most 500 kg/m$^3$ determined by gas displacement pycnometer according to ASTM D2840 (1969).

Such first fillers are commercially available, for example under the trade names Micropearl® microspheres, manufactured by Lehmann & Voss; Expancel®, manufactured by AkzoNobel; Advancell® expandable microspheres, manufactured by Sekisui Chemical Co; or Microsphere®, Microsphere®F-E, and Microsphere®F-DE; manufactured by Matsumoto Yushi Seiyaku Co.

In some embodiments, the second filler comprises expanded glass particles, preferably expanded silica glass particles wherein the type of glass is selected from the group comprising: borosilicate glass, fused borosilicate glass, soda-lime-borosilicate glass, or natural volcanic ore. In a more preferred embodiment, the second filler comprises expanded perlite particles or expanded fused borosilicate glass particles. In yet an even more preferred embodiment, the second filler comprises expanded fused borosilicate glass particles.

In some embodiments, the second filler has a silica content from 50 to 100% by weight, more preferably from 60 to 90% by weight, even more preferably from 70 to 80% by weight and most preferably 75 to 80% by weight, like 75 to 78% by weight, based on the total weight of the second filler.

In some embodiments, the at least one second filler has a true density of at most 750 kg/m$^3$, preferably of at most 600 kg/m$^3$, more preferably of at most 500 kg/m$^3$, and most preferably of at most 400 kg/m$^3$, as determined by gas displacement pycnometer according to ASTM D2840 (1969).

Such second fillers are commercially available, for example under the trade names Poraver®, manufactured by Dennert Poraver; Sphericel®, manufactured by Potters Industries; Metapor®, manufactured by Dennert Poraver; or Glass bubbles manufactured by 3M.

In some embodiments, the ratio of the total weight of the first filler to the total weight of the second filler is at least 1:40.0, preferably at least 1:30.0, more preferably at least 1:20.0, even more preferably at least 1:18.0, and most preferably at least 1:15.0.

In some embodiments, the ratio of the total weight of the first filler to the total weight of the second filler is at most 1:1.0, preferably at most 1:5.0, more preferably at most 1:7.0, even more preferably 1:10.0, still even more preferably 1:12.0, and most preferably at most 1:14.

In some embodiments, the ratio of the total weight of the first filler to the total weight of the second filler is at least 1:40.0 to at most 1:1.0, preferably at least 1:30.0 to at most 1:5.0, more preferably at least 1:20.0 to at most 1:7.0, even more preferably at least 1:18.0 to at most 1:10.0, still even more preferably at least 1:15.0 to at most 1:12.0, and most preferably at least 1:15.0 to at most 1:14.0. The effect of the above mentioned ratios of total weight of the first filler to the total weight of the second filler results in an optimal balance between a low density and the coating performances. The more first filler used compared to the second filler, the lower the density but the higher impact on coating performances.

In some embodiments, the at least one first filler and the at least one second filler have a true density of at most 750 kg/m$^3$, preferably of at most 600 kg/m$^3$, more preferably of at most 500 kg/m$^3$, and most preferably of at most 400 kg/m$^3$, as determined by a gas displacement pycnometer according to ASTM D2840 (1969).

In certain embodiments, the compositions of the present invention comprise at least one colourant. The colourant component of the composition may comprise one or more inorganic or organic, transparent or non-transparent pigments. Non-limiting examples of such pigments are titanium dioxide, iron oxides, mixed metal oxides, bismuth vanadate, chromium oxide green, ultramarine blue, carbon black, lampblack, monoazo and disazo pigments, anthraquinones, isoindolinones, isoindolines, quinophthalones, phthalocyanine blues and greens, dioxazines, phthalocyanines, thioindigos, quinacridones and diketo-pyrrolopyrroles; and extender pigments including ground and crystalline silica, barium sulphate, magnesium silicate, calcium silicate, mica, micaceous iron oxide, calcium carbonate, zinc oxide, aluminium hydroxide, aluminium silicate and aluminium silicate, gypsum, feldspar, talcum, kaolin, and the like. The amount of pigment that is used to form the composition is understood to vary, depending on the particular composition application, and can be zero when a clear composition is desired.

For example, a composition may comprise up to about 50% by weight, for example about 5 to about 40% by weight of pigment based on the solids content of the coating composition, preferably up to 30% by weight of pigment based on the solids content of the coating composition. Depending on the particular end use, a preferred composition may comprise approximately 10 to 25% by weight of pigment based on the solids content of the coating composition.

In some embodiments, the ratio of the pigment volume concentration (PVC) over the critical pigment volume concentration (cPVC) is from at least 0.70 to at most 1.30, preferably from at least 0.80 to at most 1.20, more preferably from at least 0.90 to at most 1.10, even more preferably from at least 0.97 to at most 1.01, and most preferably from at least 0.99 to at most 1.00.

In some alternative embodiments, the ratio of the pigment volume concentration (PVC) over the critical pigment volume concentration (cPVC) is from at least 0.70 to at most 1.30, preferably from at least 0.80 to at most 1.27, more preferably from at least 0.90 to at most 1.25, even more preferably from at least 0.95 to 1.23, and most preferably from at least 1.05 to at most 1.20. Such a ratio makes the coating compositions particularly suitable for interior use.

The pigment volume concentration (PVC) of a coating composition may be defined as the volume percentage of solid particles in the system after film formation by formula (I):

$$PVC = \frac{V_p + V_f}{V_p + V_f + V_b} \cdot 100\%; \quad (I)$$

wherein Vp is the total volume of all pigments in the composition, Vf is total volume of all fillers in the composition, and Vb is the total volume of the non-volatile part of the binders in the composition.

In some embodiments, the critical pigment volume concentration (cPVC) for a pigment combination can be calculated from the oil absorption (OA) provided that the OA value is based on a non-flocculated dispersion, according to formula (II):

$$cPVC = \frac{1}{1 + (OA)(\rho)/93.5}; \quad (II)$$

wherein OA is expressed as grams of linseed oil per 100 grams of pigment, ρ is the relative density of the pigment(s), and 93.5 is 100 times the relative density of linseed oil. Both OA and cPVC are expressed as percentages and not as fractions. The definitions of both OA and cPVC are based on close-packed pigment-binder with just sufficient binder to absorb at the pigment's surface and fill all the interstices between the pigment particles.

In some embodiments, the critical pigment volume concentration (cPVC) for a pigment combination can be calculated from the oil absorption (OA) provided that the OA value is based on a non-flocculated dispersion, according to formula (III):

$$cPVC = \frac{Vp + Vf}{Vp + Vf + V_{linseed\ oil}}; \quad (III)$$

wherein further $V_{linseed\ oil}$ is the volume of linseed oil based on respective oil absorption of filler and pigments and their respective mass:

$V_{linseed\ oil} = \Sigma OA/93.5$ (wherein 93,5=100×Density of linseed oil), and wherein each OA=mass of filler/pigment [in g]/OA of filler/pigment [in g per 100 g of filler/pigment].

For example: $\Sigma OA = OA_{filler\ 1}/mass_{filler\ 1} + OA_{filler\ 2}/mass_{filler\ 2} + \ldots OA_{filler\ n}/mass_{filler\ n}$ In addition to, or alternatively to, one or more pigments, the coating compositions of the present invention can, in some embodiments, include at least one third (or subsequent) non-expanded filler. Examples of third non-expanded fillers that can be present in the coating composition include, but are not limited to: silica, such as precipitated silicas; clay; mica; dolomite; talc; zinc borate; magnesium carbonate; calcium oxide; calcium carbonate; calcium silicate; sodium aluminium silicate; calcium metasilicate; titanium dioxide and/or barium sulphate. In some embodiments, the non-expanded or filler is, or includes, a fibrous filler, such as milled glass fibres and/or milled carbon fibres.

In some embodiments, when used in the coating composition of the present invention, pigments and/or fillers can be present in amounts totaling from 10 to 70% by weight, preferably from 15 to 65% by weight, more preferably from 20 to 60% by weight, even more preferably from 25 to 55% by weight and most preferably from 30 to 45% by weight based on the total weight of the coating composition.

In some embodiments, from at least 1 to at most 70% by weight, preferably from at least 5 to at most 50% by weight, more preferably from at least 10 to at most 30% by weight, even more preferably from at least 12 to at most 25% by weight, and most preferably from at least 16 to at most 20% by weight, based on the total weight of fillers, is a lightweight filler, wherein said light weight filler has a true density of at most 500 kg/m$^3$, as determined by gas displacement pycnometer according to ASTM D2840 (1969). In some embodiments, the coating compositions has a solid content from 30% by weight to 80% by weight, preferably from at least 40% by weight to at most 70% by weight, more preferably from at least 50 to at most 60% by weight as determined at 125° C. for two hours according to ISO 3251:2008.

In some preferred embodiments, the coating composition is a water-borne coating composition, preferably the coating composition comprises at least 45% by weight to at most 75%, preferably at least 50% by weight to at most 70% and more preferably at least 55% by weight to at most 65% by weight water, based on the weight of the total coating composition. Water may be added to the composition as such, e.g. tap water, or added in combination with another component of the coating composition, such as the binder, which might be emulsified or suspended in water. Typically, the polymeric binder might be added as a 45% by weight to 55% by weight suspension or emulsion.

In some embodiments, the coating compositions further include one or more solvents, such as organic solvents. The solvent(s) are present, in some embodiments, so as to facilitate film forming, adjust drying properties and contribute to the application performances.

Examples of solvents that can be included in some embodiments of the coating compositions of the present invention include, but are not limited to: aliphatic solvents such as VM & P NAPTHA; acetates, such as butyl acetate and hexyl acetate; mono and dialkyl ethers of ethylene, propylene and diethylene glycols, such as ethylene glycol monoethyl ether, ethylene glycol monobutyl ether, diethylene glycol diethyl ether, propylene glycol monomethyl ether, and dipropylene glycol ether; and monoalkyl ethers of monoester glycols, such as ethylene glycol monoethylether acetate and propylene glycol monomethyl ether acetate. In some embodiments, the coating compositions of the present invention include one or more solvents in an amount of at most 20% by weight, based on the total dry weight of the polymer binder.

The compositions of the present invention may include other additives, e.g. catalysts, other pigments and pigment pastes, dyes, stabilizers, wetting agents, thixotropic agents, anti-sagging agents, anti-oxidants, bactericides, fungicides, algaecides, anti-settling agents, insecticides, antifoaming agents, slip agents, flow and levelling agents, rheological modifiers, UV-absorbers, HALS-radical scavengers, matting agents, waxes, mineral oils, flame retardants, loss of dry inhibitors, optical brighteners, adhesion promoters, diluents, elastomers, plasticizers, air release agents, absorbents, anti-crater additives, coalescing agents, reinforcing agents, polymeric opacifier dispersing aids, plasticizers, thixotropes, substrate wetting agents, odorants, corrosion inhibitors and corrosion-inhibitive pigments, additional hardeners and additional curable compounds, depending on the application. Certain embodiments of the compositions of the present invention include surface active agents, such as any of the well-known anionic, cationic or non-ionic surfactants or dispersing agents. Examples of antioxidants and UV light absorbers include, but are not limited to, those available commercially from BASF under the trademarks IRGANOX and TINUVIN. Examples of thixotropes include, but are not limited to, fumed silica, bentonite, stearic acid-coated calcium carbonate, polyamide, and fatty acid/oil derivatives. Examples of suitable additives that may be added to the composition may be found in Additives Guide, Paint & Coatings Magazine, May 2006, hereby incorporated by reference thereto. Preferably the additives are selected from the group comprising: wetting agents, antifoaming agents, rheological modifiers, coalescing agents, dispersing aids. These optional additives, when used, can be present in amounts up to 40% by weight, preferably up to 30% by weight, more preferably up to 20% by weight, even more preferably up to 15% by weight and most preferably up to 10% by weight based on total weight of the coating composition.

In some embodiments, the coating composition has a relative density from at least 0.80 to at most 1.30, preferably from at least 0.90 to at most 1.20, more preferably from at least 0.95 to at most 1.15, even more preferably from at least 0.97 to at most 1.10, still more preferably from at least 0.98 to at most 1.05, and most preferably from at least 0.99 to 1.03.

In some alternative embodiments, the coating composition has a relative density from 0.80 to at most 1.30, preferably from 0.90 to at most 1.30, more preferably from 1.00 to at most 1.30, even more preferably from 1.00 to at most 1.20, still more preferably from 1.00 to at most 1.15, and most preferably from 1.05 to 1.10. Such a density makes the coating composition particularly suitable for interior use.

In some embodiments, the coating composition is formulated as a 1K composition, also known as a one-component composition. In a preferred embodiment of the invention, the coating composition is formulated as a one package composition. The term "one package composition" refers to a stable one package composition, also referred to as a 1K composition or a one-component composition. A 1K or one package composition will be understood as referring to a composition wherein all of the components are maintained in the same container after manufacture, during storage etc. A 2K composition or a multi-component composition will be understood as referring to a composition wherein various components are maintained separately until just prior to application.

In some embodiments, the coating composition provides a matt finish upon curing, the gloss level of the cured coating composition is at most 20.0%, preferably at most 15.0%, more preferably at most 10.0%, even more preferably at most 7.0%, still even more preferably at most 5.0% and most preferably at most 2.5%, measured by a gloss meter, under an angle of 60° and on a 2 times 200 µm cured layer of coating composition, determined according to NF EN ISO 2813.

In some embodiments, the coating composition provides a matt finish upon curing, the gloss level of the cured coating composition is at most 10.0%, preferably at most 7.5%, more preferably at most 5.0%, even more preferably at most 2.5%, still even more preferably at most 2.0%, and most preferably at most 1.0%, measured by a gloss meter, under an angle of 85° and on a 2 times 200 µm cured layer of coating composition, determined according to NF EN ISO 2813.

In some embodiments, the volatile organic compound (VOC) content of the coating composition is at most 150 g/l, preferably at most 100 g/l, more preferably at most 75 g/l, still more preferably at most 50 g/l, yet still more preferably at most 40 g/l, and most preferably at most 20 g/l, determined according ISO 11890-2 (2013).

The term "volatile organic compound" refers to any organic compound having an initial boiling point less than or equal to 250° C. measured at a standard atmospheric pressure of 101.3 kPa.

In some embodiments, the water-vapour transmission rate (Sd) of the cured coating composition is from at least 0.05 to at most 0.70 m, preferably from at least 0.07 to at most 0.60 m, more preferably from at least 0.10 to at most 0.50 m, as determined by ISO 7783-2 (2011) 8.1.1.

In some embodiments, the water-vapour transmission (V) of the cured coating composition is from at least 30 to at most 420 $g/m^2$, preferably from at least 35 to at most 300 $g/m^2$, more preferably from at least 42 to at most 210 $g/m^2$, as determined by ISO 7783-2 (2011) 8.1.1.

In a second aspect, the coating composition according to the first aspect of the invention, or preferred embodiments thereof, can be used and/or formulated as coating, varnish, lacquer, paint, stain, enamel.

Preferably, the coating composition is a wall paint, such as an interior wall paint or an exterior wall paint. In some embodiments, the coating composition is an exterior wall masonry paint. In some embodiments, the coating composition is an interior wall masonry paint.

Wall paints typically differ from metal coatings. For example, a metal coating would use a polymeric binder that would be suitable for metal application that requires adhesion on metallic material, anti-flash rust additives, anticorrosive properties, and low water vapour permeability.

Wall paints typically have high water vapour permeability which is too high, poor adhesion on metal and no metal protection ability (anticorrosive).

In a preferred embodiment, the present invention relates the use of the coating composition as described above as an exterior wall masonry paint.

The coating compositions of the present invention can be applied to various substrates including wood, paper, dry wall, and synthetic materials (such as plastics including elastomeric substrates), glass, ceramic, metals (such as iron, steel and aluminium), concrete, plaster-board, gypsum-board, mortar, brick, and the like. Preferably, the coating compositions of the present invention are applied to various substrates selected from the group comprising: concrete, dry walls, and brick.

As a result, the present invention is also directed to substrates at least partially coated with at least one coating composition of the present invention. The substrates may be pre-treated before application of the at least one coating composition. The substrates may be post-treated after application of the at least one coating composition, with any other compositions.

Any known method can be used to apply the coating compositions of the invention to a substrate. Non-limiting examples of such application methods are spreading (e.g., with paint pad or doctor blade, or by brushing or rolling), spraying (e.g., air-fed spray, airless spray, hot spray, and electrostatic spray), flow coating (e.g., dipping, curtain coating, roller coating, and reverse roller coating), and electrodeposition. (See generally, R. Lambourne, Editor, Paint and Surface Coating: Theory and Practice, Eilis Horwood, 1987, page 39 et seq.). The preferred application methods are spreading and spraying, more preferably brushing, rolling, or airless spraying.

The coating compositions of the present invention can be applied and fully cured at ambient temperature conditions in the range of from about 0° C. to 50° C. Curing of the polymer composition according to the invention typically can proceed very rapidly, and in general can take place at a temperature within the range of from 1° C. to +45° C., in particular from 3° C. to 40° C., more in particular from 5° C. to 35° C.

The coating compositions of the present invention may be used as a single coating, a top coating, a base coating in a two-layered system, or one or more layers of a multi-layered system including a top coating composition, base coating composition, or as a primer layer. A typical opaque system may comprise: 1 layer of primer and 1 or 2 layers of top coat (a total of 3 layers). Alternative opaque system may comprise: 1 primer layer, 1 layer of mid coat and 1 layer top coat.

The invention will be more readily understood by reference to the following examples, which are included merely for purpose of illustration of certain aspects and embodiments of the present invention and are not intended to limit the invention.

EXAMPLES

Unless otherwise indicated, all parts and all percentages in the following examples, as well as throughout the specification, are parts by weight or percentages by weight respectively.

The colour reading of the cured coating compositions on Leneta Charts was measured using a Datacolour 400 dual beam spectrophotometer against the standard white background.

The gloss level of a paint film was measured after 24 hours of drying with Tri-Gloss 20°65°85° reflectometer from Brant in accordance with NF EN ISO.

Mechanical film properties, i.e. tensile strength, percent elongation at break, and Young's modulus were characterized using an Instron Serie 3340 tensile strength tester according to EN ISO 527-1. Free coating films of 500 μm up to 1.000 μm thickness released from the substrate were placed in climate room conditioned for 28 days (23° C. and 50% RH) before placing in the grips of the tensile strength tester.

Density Stability

Paint compositions were formulated comprising different amounts of light weight glass and/or polymer fillers. The formulations are formulated to maintain a constant PVC/cPVC value of 1.01. Table 1 illustrates the properties of several coating compositions.

F1=Fused borosilicate glass lightweight filler with a true density of 340 kg/m$^3$. This filler is formulated comprising a 100% solid content.

F2=Vinylidene chloride and acrylonitrile copolymer lightweight filler with a true density of 36 kg/m$^3$. This filler is formulated comprising a 15% solid content. This filler has a D50 of 30-50 μm. F2A has a density of 36 kg/m$^3$, while F2B has a density of 24 kg/m$^3$.

F3=Soda-lime-borosilicate glass with a true density of 370 kg/m$^3$. This filler is formulated comprising a 100% solid content.

F4=Perlite with a true density of 200 kg/m$^3$. This filler is formulated comprising at least 97% solid content.

TABLE 1

| | Acrylic binder Tg = 25° C. (%) | Acrylic binder Tg = 10° C. (%) | F1 (%) | F2 (%) | TiO$_2$ (%) | Ecodis P90 | PVC/cPVC | Density of composition | Density of composition after 7 days at 50° C. | Brookfield viscosity B6, 50 rpm, 20° C. | Contrast ratio | Gloss 60°/85° |
|---|---|---|---|---|---|---|---|---|---|---|---|---|
| Comp. example 1 | 19.9 | 7.32 | 0 | 0 | 15 | 0.45 | 1.01 | 1.6 | 1.577 | 79 | 98 | 2.3%/1.3% |
| Comp. example 2 | 19.9 | 7.32 | 7 | 0 | 16 | 0.45 | 1.01 | 1.064 | 1.102 | 105 | 95 | 1.9%/0.5% |
| Comp. example 3 | 19.9 | 7.32 | 9 | 0 | 16 | 0.45 | 1.01 | 0.99 | 1.205 | 100 | 92 | 1.8%/0.4% |
| Example 1 | 22.0 | 10 | 3.5 | 0.3 | 18 | 0.45 | 0.92 | 1.01 | 1.035 | 66 | 95.5 | 2.0%/0.4% |
| Example 2 | 22.0 | 13 | 4 | 0.3 | 18 | 0.45 | 0.91 | 0.982 | 1.008 | 97 | 95 | 2.2%/0.4% |

The density of the composition is determined by ISO 2811-1 (2011) at 20° C. using metal pycnometer. The viscosity of the composition is determined according to ISO 2555 (1989). The contrast ratio of the composition is determined according to ISO 6504/1(1983). All the compositions further comprise talc and calcium carbonate as extra fillers. In example 1 and 2, the dry-weight content of the F2 filler was 15%. The F2 filler was present in 2% as a wet formulation, therefore the dry-weight content was 0.3%.

Table 2 illustrates the properties of several coating compositions.

TABLE 2

|  | Example 3 | Example 4 | Example 5 |
|---|---|---|---|
| Water | 40% | 38% | 22% |
| Acrylic binder (dry wt %) | 14% | 14% | 30% |
| F2 | 0.45% | 0.45% | 0.45% |
| F1 | 5% | 5% | 6% |
| TiO$_2$ | — | 7% | 20% |
| Others | 38% | 33% | 19% |
| Tests on the day compositions were made | | | |
| Brookfield viscosity RV6/50 TPM 20° C. | 125 P | 149 P | 96 P |
| Density | 0.994 | 1.0316 | 0.9836 |
| pH | 9.25 | 9.07 | 9.24 |
| PVC | 78.4 | 78.3 | 82.8 |
| cPVC | 79.6 | 78.8 | 84.4 |
| PVC/cPVC | 0.985 | 0.993 | 0.9810 |
| Whiteness (2 × 200 μm) | — | 76.410 | 78.090 |
| Yellow index (2 × 200 μm) | — | 3.890 | 4.310 |
| Contrast ratio (200 μm) | 49.950 | 0.902 | 96.770 |
| Gloss 60°/85° (2 × 200 μm) | 2.2%/1.4% | 2.1%/0.9% | 1.9%/0.8% |
| After 12 days at 50° C. | | | |
| Brookfield viscosity RV6/50 TPM 20° C. | 110 P | 135 P | 100 P |
| Density | 1.0127 | 1.039 | 1.024 |
| pH | 9.2 | 9.3 | 9.1 |
| Whiteness (2 × 200 μm) | — | 74.3 | 73.34 |
| Yellow index (2 × 200 μm) | — | 4.5 | 5.67 |
| Gloss 60°/85° (2 × 200 μm) | 2.4%/1.5% | 2.1%/0.9% | 2%/1.1% |
| VOC - Boiling point | 22 g/L | 13 g/L | 12 g/L |
| Water Vapour permeability Sd (m) EN ISO7783-2 | 0.10 | 0.12 | 0.14 |

Table 3 illustrates the properties of several coating compositions.

Examples 6 to 13 comprise the same type and amount of expanded polymeric microspheres as filler and binder.

Examples 7, 8 and 10 showed viscosity instability at 50° C./15 days. Examples 6-13 showed density stability up to 15 days.

Table 4 illustrates the properties of several coating compositions.

TABLE 4

|  | PVC/ CPVC | Expanded glass filler (%) | Type of expanded glass filler | Density | Contrast ratio |
|---|---|---|---|---|---|
| Comparative Example 4 | 0.73 | 0 | — | 1.4 | 99 |
| Example 14 | 0.77 | 2.5 | F3 | 1.053 | 92 |
| Example 15 | 0.49 | 3 | F1 | 1.042 | 97 |

Comparative Example 4 does not comprise any expanded polymeric filler nor does it comprise any expanded glass filler. Examples 14 and 15 comprise the same type and amount of expanded polymeric microspheres as filler. Comparative Example 4, Examples 14 and 15 all comprise the same binder.

It is to be understood that although preferred embodiments and/or materials have been discussed for providing embodiments according to the present invention, various modifications or changes may be made without departing from the scope and spirit of this invention.

Table 5 provides the properties of several commercial comparative examples.

TABLE 3

|  | PVC/cPVC | 2$^{nd}$ filler | 2$^{nd}$ light filler (%) | Tg of acrylic binder (° C.) | Density | Density After 15 days at 50° C. | Viscosity after 15 days at 50° C. |
|---|---|---|---|---|---|---|---|
| Example 6 | 0.95 | F3 | 4 | 20 | 1.083 | Stable | Stable |
| Example 7 | 0.93 | F3 | 4 | 5 | 1.114 | Stable | Not stable |
| Example 8 | 0.94 | F3 | 6 | 20 | 1.047 | Stable | Not stable |
| Example 9 | 0.94 | F3 | 8 | 20 | 0.972 | Stable | Stable |
| Example 10 | 0.96 | F1 | 8 | 5 | 0.935 | Stable | Not stable |
| Example 11 | 0.96 | F1 | 8 | 20 | 0.957 | Stable | Stable |
| Example 12 | 0.95 | F1 | 7.5 | 20 | 0.969 | Stable | Stable |
| Example 13 | 0.95 | F1 | 7 | 20 | 0.971 | Stable | Stable |

TABLE 5

|  | Whiteness CIE | Yellow Index | Contrast ratio | Gloss (60°/85°) | Mechanical performances (EN1062-7) | Density | Tg (° C.) of binder |
|---|---|---|---|---|---|---|---|
| Guittex L Mono | 76 | 4.95 | 99 | 5/2.5 | A2 to A5 | 1.4 | −25 to −35 |
| Sigmaflex 2000S Mat | 72 | 5.71 | 98.5 | 3/1 | A2 | 1.4 | −25 to −35 |
| Revimpex 3001 | 80 | 4 | 96 | 3/1.5 | A2 to A5 | 1.15 | −25 to −35 |
| Gorinov D3/I4 | Min 75 | Max 5 | Min 98 | 3/2 | A2 to A5 | 1.2 | −25 to −35 |

Tables 6A and 6B provide an overview on how the addition of fillers affects the properties of exterior masonry paint. Target properties have been bolded. Light filler loading reflects the % of light fillers into the paint formula. Overall coating performance reflects the key characteristics of an exterior masonry coating, for example based on ISO EN 1062-1.

TABLE 6A

| Coating binder A | Drop of density (based on intrinsic density of the filler) | Light filler loading into composition | Negative impact on overall coating performance |
|---|---|---|---|
| Glass filler | Medium | Medium | Low |
| Plastic filler | High | Low | Medium |
| Glass + plastic filler | High | High | Low |

TABLE 6B

| Coating binder B | Drop of density (based on intrinsic density of the filler) | Light filler loading into composition | Negative impact on overall coating performance |
|---|---|---|---|
| Glass filler | Medium | High | Low |
| Plastic filler | High | Low | High |
| Glass + plastic filler | High | Medium | Medium |

Coating binder A was a non-elastomeric coating binder with a Tg of 20° C. Coating binder B was an elastomeric coating binder with a Tg of −5° C.

As can be seen from Tables 6A and 6B, use of both fillers allowed to obtain a low density, while only having a limited impact on overall paint performances (such as filler loading and coating performance) for the coating binder with a Tg in the claimed range. For a coating binder with a Tg outside the claimed range, the overall paint performances were severely impacted by the combination of two fillers.

TABLE 7A

| Coating Binder A (Tg = 20° C.) PVC/cPVC = 0.98 | FILLER TYPE 1 Organic polymeric F2A | FILLER TYPE 2 Expanded Glass | | | EFFICACY TO DROP VISCOSITY Density (T + 24 H) | OVERALL COATING PERFORMANCES | | | IMPACT ON STABILITY | | |
|---|---|---|---|---|---|---|---|---|---|---|---|
| | | | | | | Contrast ratio Performance Opacity (%) | Final coating film aesthetic Gloss 60° (%) | | Density stability (2 w, 50° C.) | Viscosity (poises) (T + 24 H) | Viscosity (poises) (T + 2 w) |
| | | F4 | F1 | F3 | | | | | | | |
| Reference coating** | — | — | — | — | 1.60** | 98.1 | 2.1 | | 1.57** | 79 | 120% |
| A1** | — | 9 | — | — | 0.99 | 92.0** | 1.8 | | 1.21** | 100* | out of scale** |
| A2** | 3 | — | — | — | 1.24** | 97.4 | 2.6 | | 1.22** | 46** | 87% |
| A3 | 3 | — | 6 | — | 0.97 | 96.6 | 1.9 | | 0.97 | 88 | 93% |
| A4 | 3 | — | — | 6 | 0.99 | 97.4 | 1.9 | | 1.00 | 94 | 113% |
| A5 | 3.5 | — | — | 5.3 | 1.00 | 95.8* | 2.0 | | 1.01 | 88 | 98% |

Table 7A illustrates the properties of coatings with a non-elastomeric coating binder with a Tg of 20° C. Values with an asterisk * do not meet expected performances, while values with a double asterisk ** are not acceptable. Table 7A shows how the reference coating composition and the coating compositions with just 1 type of filler A1 and A2 are unacceptable for various parameters. Coating compositions A3, A4, and A5 have both type of fillers and show satisfactory results.

TABLE 7B

| Coating Binder B (Tg = −5° C.) PVC/cCPV = 0.70 | FILLER TYPE 1 Organic polymeric F2B | FILLER TYPE 2 ExpandedGlass | | | EFFICACY TO DROP VISCOSITY Density (T+24 H) | Contrast ratio Performance Opacity (%) | Final coating film aesthetic Gloss 60° (%) | Mechanical performances Elongation (% - 23° C.) | IMPACT ON STABILITY Viscosity (poises) (T + 24 H) | Viscosity (poises) (T + 2 w) |
|---|---|---|---|---|---|---|---|---|---|---|
| | | F4 | F1 | F3 | | | | | | |
| Reference coating** | — | — | — | — | 1.49** | 97.6 | 2.2 | 110 | 450 | 105% |
| B1** | 3 | — | — | — | 0.95 | 94.8* | 2.3 | 33** | 430 | 108% |
| B2 | — | 3 | — | — | 1.08 | 96.5 | 1.1 | 212 | 480 | 109% |
| B3* | 3 | — | 4 | — | 0.94 | 95.7* | 2.4 | 72* | 490 | 111% |

Table 7B illustrates the properties of coatings with an elastomeric coating binder with a Tg of −5° C. Values with an asterisk * do not meet expected performances, while values with a double asterisk ** are not acceptable. Table 7B shows how the reference coating composition and the coating compositions with just organic polymeric fillers B1 or both fillers B3 have multiple unacceptable or undesirable properties. Only the coating composition with just glass type fillers B2 showed satisfactory results.

Therefore, there is a clear synergistic effect when both types of fillers are combined, but only for coating binders with a Tg in the claimed range.

The invention claimed is:

1. A coating composition comprising:
   a polymeric coating binder; wherein the polymeric coating binder has a glass temperature $T_g$ of at least 0° C. and at most 30° C.;
   expanded polymeric microspheres; and
   expanded glass particles;
   wherein said coating composition comprises at least 0.1% by weight and at most 25% by weight of said expanded polymeric microspheres and expanded glass particles combined, based on the total weight of the composition and wherein the ratio of the total weight of the expanded polymeric microspheres to the total weight of the expanded glass particles is at most 1:5.0.

2. The coating composition according to claim 1, wherein the ratio of the total weight of the expanded polymeric microspheres to the total weight of the expanded glass particles is at least 1:40.0.

3. The coating composition according to claim 1, wherein the ratio of the total weight of the expanded polymeric microspheres to the total weight of the expanded glass particles is at most 1:7.0.

4. The coating composition according to claim 1, wherein the expanded polymeric microspheres comprise expanded particles of a copolymer of vinylidene chloride and acrylonitrile.

5. The coating composition according to claim 1, wherein the expanded glass particles comprise expanded perlite particles.

6. The coating composition according to claim 1, wherein the polymeric coating binder is selected from: a (meth) acrylic coating binder, a vinylic coating binder, a silicone-based coating binder, a siloxane-based binder, or any mixture thereof.

7. The coating composition according to claim 1, wherein the polymeric coating binder has a glass temperature $T_g$ of at least 7° C. and at most 27° C.

8. The coating composition according to claim 1, wherein the ratio of the pigment volume concentration (PVC) over the critical pigment volume concentration (cPVC) is from at least 0.70 to at most 1.30.

9. The coating composition according to claim 1, wherein the total amount of polymeric coating binder in the coating composition ranges from at least 1 to at most 40% by weight, compared to the total weight of said coating composition.

10. The coating composition according to claim 1, wherein the expanded polymeric microspheres and the expanded glass particles have a true density of at most 750 kg/m$^3$, as determined by gas displacement pycnometer according to ASTM D2840 (1969).

11. The coating composition according to claim 1, wherein the expanded polymeric microspheres have a true density of at most 100 kg/m$^3$, as determined by gas displacement pycnometer according to ASTM D2840 (1969).

12. The coating composition according claim 1, wherein the coating composition has a relative density from at least 0.80 to at most 1.30.

13. A method for coating an exterior wall masonry comprising applying the coating of claim 1 to at least a portion of said masonry.

14. A substrate having applied thereon a coating composition according to claim 1.

15. The coating composition according to claim 1, wherein the ratio of the total weight of the expanded polymeric microspheres to the total weight of the expanded glass particles is at most 1:10.0.

16. The coating composition according to claim 1, wherein the ratio of the total weight of the expanded polymeric microspheres to the total weight of the expanded glass particles is at most 1:12.0.

17. The coating composition according to claim 1, wherein the ratio of the total weight of the expanded polymeric microspheres to the total weight of the expanded glass particles is at most 1:14.0.

* * * * *